United States Patent
Richardson et al.

(10) Patent No.: US 11,339,239 B2
(45) Date of Patent: May 24, 2022

(54) POLYMER COMPOSITION AND USE FOR MAKING ADHESIVE AND ARTICLE CONTAINING IT

(71) Applicant: Total Raffinage Chimie, Courbevoie (FR)

(72) Inventors: Christine-Joy Richardson, Lyons (FR); Stéphane Kressmann, Communay (FR); Steven Henning, Downington, PA (US); Keith Nelson, Exton, PA (US); Delphine Minoux, Nivelles (BE)

(73) Assignee: FINA TECHNOLOGY, INC., Houston, TX (US)

( * ) Notice: Subject to any disclaimer, the term of this patent is extended or adjusted under 35 U.S.C. 154(b) by 69 days.

(21) Appl. No.: 16/981,358

(22) PCT Filed: Mar. 15, 2019

(86) PCT No.: PCT/EP2019/056558
§ 371 (c)(1),
(2) Date: Sep. 16, 2020

(87) PCT Pub. No.: WO2019/175394
PCT Pub. Date: Sep. 19, 2019

(65) Prior Publication Data
US 2021/0371563 A1    Dec. 2, 2021

(30) Foreign Application Priority Data

Mar. 16, 2018 (EP) ..................................... 18305300
Feb. 11, 2019 (EP) ..................................... 19305170

(51) Int. Cl.

| | | |
|---|---|---|
| *C08F 210/14* | (2006.01) | |
| *C08F 236/04* | (2006.01) | |
| *C08F 236/06* | (2006.01) | |
| *C08F 236/08* | (2006.01) | |
| *C08F 236/10* | (2006.01) | |
| *C08F 236/22* | (2006.01) | |
| *C08F 4/14* | (2006.01) | |
| *C08F 212/12* | (2006.01) | |
| *C09J 109/06* | (2006.01) | |
| *C09J 123/20* | (2006.01) | |

(52) U.S. Cl.
CPC .............. *C08F 236/10* (2013.01); *C08F 4/14* (2013.01); *C08F 210/14* (2013.01); *C08F 212/12* (2013.01); *C09J 109/06* (2013.01); *C09J 123/20* (2013.01); *C08F 236/045* (2013.01); *C08F 236/06* (2013.01); *C08F 236/08* (2013.01); *C08F 236/22* (2013.01)

(58) Field of Classification Search
None
See application file for complete search history.

(56) References Cited

U.S. PATENT DOCUMENTS

| | | | |
|---|---|---|---|
| 3,932,537 A | 1/1976 | Wetzel et al. | |
| 3,954,897 A * | 5/1976 | Yamato | A61K 8/8111 585/18 |
| 4,303,555 A | 12/1981 | Boden et al. | |
| 4,359,412 A | 11/1982 | Boden | |
| 4,366,078 A | 12/1982 | Boden et al. | |
| 4,608,193 A | 8/1986 | Sprecker et al. | |
| 4,677,176 A | 8/1987 | Evans et al. | |
| 5,166,455 A | 11/1992 | Chin et al. | |
| 5,221,776 A | 6/1993 | Alexander | |
| 5,243,121 A | 9/1993 | Madon et al. | |
| 5,656,698 A | 8/1997 | Hentges et al. | |
| 7,696,395 B2 | 4/2010 | Merrill | |
| 8,378,160 B2 | 2/2013 | Gruber et al. | |
| 2004/0171778 A1 * | 9/2004 | Donker | C08L 2666/24 526/290 |
| 2006/0030741 A1 | 2/2006 | Smith et al. | |
| 2008/0306320 A1 | 12/2008 | Merrill | |
| 2010/0022817 A1 | 1/2010 | Butler et al. | |
| 2010/0069542 A1 | 3/2010 | Gelbin et al. | |
| 2012/0157725 A1 | 6/2012 | McAuliffe | |
| 2017/6029668 | 2/2017 | Nelson et al. | |

FOREIGN PATENT DOCUMENTS

| | | | |
|---|---|---|---|
| CN | 106699972 A * | 5/2017 | |
| JP | H07223985 A | 8/1995 | |
| WO | 0177196 A1 | 10/2001 | |
| WO | 2012050658 A1 | 4/2012 | |
| WO | 2012052427 A1 | 4/2012 | |

OTHER PUBLICATIONS

Rozentsvet, V. A. et al., "Cationic Oligomerization of the Pyrolysis C5 Fraction", Petroleum Chemistry 2018, 58(8), 694-701. (Year: 2018).*
International Preliminary Report on Patentability for International Application No. PCT/EP2019/056558, dated Mar. 2, 2020, 5 pages.
International Search Report and Written Opinion for International Application PCT/EP2019/056558, dated Jun. 11, 2019, 8 pages.
Antunes et al., "Alkenes Oligomerization with Resin Catalysts", Fuel Processing Technology, 2015, vol. 138, pp. 86-99.
Izquierdo et al., "New Biodiesel Additives from Glycerol and Isoamylenes", Biofuels, Bioproducts & Biorefining, 2014, vol. 8, No. 5, pp. 658-669.
Yan et al., "Hydrothermal Modification Effect on the Catalyst for Etherification", Advanced Materials Research, 2013, vols. 805-806, pp. 1368-1375.
Soto et al., "Equilibrium of the Simultaneous Etherification of Isobutene and Isoamylenes with Ethanol in Liquid-Phase", Chemical Engineering Research and Design, 2014, vol. 92, No. 4, pp. 644-656.

(Continued)

*Primary Examiner* — Richard A Huhn
(74) *Attorney, Agent, or Firm* — Albert Shung

(57) ABSTRACT

Polymer composition obtained from polymerization of $C_5$ olefin composition, use for making an adhesive, and article or composite containing it.

16 Claims, No Drawings

(56) References Cited

OTHER PUBLICATIONS

Izquierdo et al., "Fuel Additives from Glycerol Etherification with Light Olefins: State of the Art", Renewable and Sustainable Energy Reviews, 2012, vol. 16, No. 9. pp. 6717-6724.
González-Rugerio et al., "TAEE Synthesis From Isoamylenes and Ethanol by Catalytic Distillation: Pilot Plant Experiments and Model Validation", Fuel Processing Technology, 2012, vol. 102, pp. 1-10.
Okafor et al., "Microreactor Performance Studies of the Cycloaddition of Isoamylene and α-Methylstyrene", Industrial & Engineering Chemistry Research, 2010, vol. 49, No. 12, pp. 5549-5560.
Granger et al., "Navel, Protected, Functionalized Initiators for Anionic Polymerizations", Polymer Preprints, 1999, vol. 40, No. 2, pp. 786-787.
Liu et al., "Methoxyl Methyl Ether Isoamylene Quercetin, a Quercetin Derivative, Protects Rat Aorta Endothelial Cells Against Oxidation and Apoptosis", Journal of Chinese Pharmaceutical Sciences, 2013, vol. 22, No. 4, pp. 355-360.
Löning et al., "Dewatering of Solvent Mixtures—Comparison Between Conventional Technologies and a New One", Chemical Engineering & Technology, 2001, vol. 24, No. 3, pp. 242-245.

\* cited by examiner

POLYMER COMPOSITION AND USE FOR MAKING ADHESIVE AND ARTICLE CONTAINING IT

BACKGROUND

Tackifying resins belong to a class of polymers that is characterized by low molecular weight, high glass transition temperature, and a roughly linear correlation of Tg to molecular weight in polymers of similar structure. These resins are made from copolymerization of styrene or derivative, a diene such as piperylene and a $C_5$ olefin. Preferred $C_5$ olefin is chosen among specific isomers of methyl butenes aka isoamylenes, namely 2-methylbut-2-ene (2MB2) and 2-methylbut-1-ene (2MB1).

2MB2 (isoamylene) and 2MB1 are used in resin polymerization to control Tg and molecular weight due to their propensity for chain transfer. Their reactivity and chain transfer capability is a result of their branched olefin structure. 3-methylbut-1-ene (3MB1), being a terminal non-branched olefin, is less capable in this capacity.

2MB2 and 2MB1 are usually produced by the deep catalytic cracking (DCC) of vacuum gas oil. DCC is similar to fluid catalytic cracking (FCC) and produces a higher yield of propylene, isobutylene, and isoamylene. With increased demand for propylene, DCC has grown in favor. Nonetheless, one could consider alternative methods to the production of branched $C_5$ olefins via dehydrogenation and/or isomerization of normal olefins and alkenes and the enzymatic conversion of hydroxyalkanoic acids.

Below are references for the production of isoamylenes and other $C_4$ and $C_5$ branched olefins, and their use:

U.S. Pat. No. 5,221,776 describes a catalyst for the isomerization of $C_5$ olefins to produce isoamylenes. U.S. Pat. No. 5,243,121 describes a fluid catalytic cracking process for increased production of isobutylene and isoamylenes. U.S. Pat. No. 5,166,455 describes a process for converting $C_5$-$C_7$ olefins (e.g. FCC light naphtha) to isobuene- and isoamylene-rich streams. WO 2012052427A1 describes the production of alkenes by the combined enzymatic conversion of 3-hydroxyalkanoic acids using different mevalonate pyrophosphate decarboxylases.

U.S. Pat. No. 8,378,160 describes a process for preparing a hydrocarbon olefin composition from a feedstock derived from biomass. The process includes dehydrating isobutanol to obtain $C_4$ olefins, which are then oligomerized to form dimers and trimers.

2MB2 is most commonly used as a starting material for other products as opposed to being used as is for some final application. While not an exhaustive one, the public literature reveals several uses for isoamylene. These include (i) hydrocarbon resin modification (softening point/Tg/molecular weight control), (ii) fuel additives via oligomerization (typically dimerization) for octane boosters or via etherification with methanol or ethanol, (iii) synthetic building block such as precursor to diolefins, flavor/fragrance enhancers, antioxidants, typically alkyl phenols, or as synthon for fine chemicals or pharmaceutical ingredients preparation.

With regards to hydrocarbon Resin Modification, WO 2012050658A1 describes the use of isoamylene to control softening point and molecular weight (Mz) in the synthesis of hydrocarbon resins, U.S. Pat. No. 5,656,698 describes use in the synthesis of hydrocarbon tackifying resins, U.S. Pat. No. 4,677,176 also describes use in the synthesis hydrocarbon tackifying resins.

As per fuel additive, US 20120157725A1 describes the partial hydrogenation of isoprene to a mixture of isoamylenes which can be reacted with alcohols to afford oxygenates such as TAME, acid catalytically dimerized, or reacted with HF to produce high octane alkylates. Fuel Processing Technology (2015)138, 86-99 describes the use of cationic exchange resins for the oligomerization of isoamylene for production of octane boosters. Biofuels, Bioadditives & Biorefining (2014), 8(5), 658-669 describes the catalytic etherification of glycerol (a byproduct of biodiesel production) and isoamylenes to produce oxygenated fuel additives. Advanced Material Research (Durnten-Zurich, Switzerland) (2013), 805-806 describes catalysts for the etherification of isoamylene and methanol. Chemical Engineering Research and Design (2014), 92(4), 644-656 describes catalysts for the simultaneous etherification of isobutene and isoamylenes with ethanol. Renewable & Sustainable Energy Reviews (2012), 16(9), 6717-6724 is a review of methods for the etherification of glycerol with light olefins such as isobutene and isoamylenes. Fuel Processing Technology (2012), 102, 1-10 describes the synthesis of tert-amyl ethyl ether (TAEE) from isoamylene and ethanol. US 20060030741 describes a process for the etherification of $C_4$, $C_5$, and/or $C_6$ iso-olefins.

As synthetic precursor to diolefins building block, US 20080306320A1/U.S. Pat. No. 7,696,395B2 (Fina Technology) describes a method for the dehydrogenation of isoamylene to make isoprene, and US 20100022817 describes the dehydrogenation of hydrocarbons to alkenes, e.g. n-pentene to piperylene, n-butane to butadiene, and isoamylene to isoprene.

As synthetic flavor and fragrance enhancer building block, U.S. Pat. No. 4,366,078 (International Flavors and Fragrances) describes the dimerization of isoamylene to form diisoamylene mixture that is used as an aroma enhancer. U.S. Pat. No. 4,608,193 claims isochroman derivatives made from alpha methylstyrene and isoamylene as aroma potentiators in perfumes. U.S. Pat. No. 4,359,412 describes the production of C11 acetates used as flavoring agents via isoamylene dimerization. Reaction of the product with formaldehyde via the Prins reaction is followed by acetylation by treatment with acetic anhydride. U.S. Pat. No. 4,303,555 describes the production of isoamylene dimers for enhancing or augmenting the aroma of perfumes or colognes. Industrial & Engineering Chemistry Research (2010), 49(12), 5549-5560 describes the cycloaddition of isoamylene and alpha methylstyrene to form 1,1,2,3,3-pentamethylindane, an intermediate in the synthesis of musk fragrances.

As antioxidant, U.S. Pat. No. 3,932,537 describes a method for the alkylation of phenol with isobutylene or isoamylene. JP 07223985 describes the preparation of 2-methyl-6-tert-amyl phenol via reaction of cresol with isoamylene. The product is an intermediate for phenolic antioxidants. US 20100069542 describes use of amylene to synthesize liquid amylaryl phosphites that are then used as stabilizers in various polymers.

Other uses of isoamylenes are described in the following papers: Polymer Preprints (ACS, Division of Polymer Chemistry) (1999), 40(2), 786-787 discusses the use of isoamylene in the synthesis of anionic initiators. J. of Chinese Pharmaceutical Sciences (2013), 22(4), 355-360 describes the synthesis of methoxy methyl ether isoamylene quercetin (MIAQ) that are useful in assisting the healing of injured rat aorta endothelial cells. Chemical Engineering &

Technology (2001), 24(3), 242-245 describes the dewatering of chloroform by the catalytic conversion of isoamylene to isoamyl alcohol.

Albeit isoamylenes are commercially available, cheaper alternative sources as well as alternative tackifying polymers obtained therefrom are desirable.

SUMMARY

The present invention is directed to a composition resulting from polymerization, in the presence of a catalyst or initiating system, of at least
(i) a C4-C6 conjugated diene or a C15 hydrocarbon having at least one olefinic functional group,
(ii) a C5 olefin mixture,
and optionally
(iii) an optionally substituted vinyl aromatic,
said composition having a glass transition temperature Tg above 35° C., wherein said C5 olefin mixture contains at least 5 wt % of an olefin mixture comprising (a) 2-methyl-but-2-ene, (b) 2-methyl-but-1-ene and (c) 3-methyl-but-1-ene.

DETAILED DESCRIPTION

According to a first aspect, the instant invention discloses a composition resulting from polymerization, in the presence of a catalyst or initiating system, of at least (i) a $C_4$-$C_6$ conjugated diene or a $C_{15}$ hydrocarbon having at least one olefinic functional group, (ii) a $C_5$ olefin mixture, and optionally (iii) an optionally substituted vinyl aromatic, said composition having a glass transition temperature Tg above 35° C., wherein said $C_5$ olefin mixture contains at least 5 wt % of an olefin mixture comprising (a) 2-methyl-but-2-ene, (b) 2-methyl-but-1-ene and (c) 3-methyl-but-1-ene.

Unexpectedly, it has been found that $C_5$ olefins mixtures in the above mentioned proportions were as efficient as pure 2-methyl-but-2-ene for polymerization optionally in the presence of an optionally substituted vinyl aromatic and in the presence of a conjugated diene such as butadiene, isoprene, cyclopentadiene.

It has been found that the above-mentioned $C_5$ olefins mixture could be efficiently obtained by dehydration of appropriate alcohol or alcohol mixture using proper dehydration catalyst. In addition, resulting $C_5$ olefin mixture has been found to be appropriate for making a polymer.

The said $C_5$ olefin mixture according to the first aspect of the invention preferably contains at least 5 wt % of an olefin mixture comprising (a) 2-methyl-but-2-ene, (b) 2-methyl-but-1-ene, (c) 3-methyl-but-1-ene and (d) cis-2-pentene and/or trans-2-pentene.

The composition according to the first aspect of the invention has a number average molecular mass Mn from 400 to 2400 g/mol, a mass average molecular mass Mw from 900 to 4000 g/mol, a Z-average molecular mass Mz from 1500 to 6000 g/mol, a molecular weight distribution Mw/Mn from 1.50 to 1.90.

Preferably, the composition according to the first aspect of the invention has having a number average molecular mass Mn from 600 to 1400 g/mol, a mass average molecular mass Mw from 1000 to 2400 g/mol, and a Z-average molecular mass Mz from 2000 to 4000 g/mol.

An advantageous source of alcohol mixture is raw or refined fusel oil, preferably a $C_{4+}$ or $C_4$-$C_6$ cut, more preferably a $C_5$ cut isolated from fusel oil. Raw fusel oil corresponds to the distillation bottoms of ethanol produced by fermentation of biomass, such as sugar cane, sugar beetroot, potatoes or any other vegetal source that is susceptible to produce alcohols by fermenting. A $C_{4+}$ cut here corresponds to a composition essentially comprising molecules having 4 or more carbon atoms within their backbone. For instance, 1-butanol, 2-methyl-1-propanol, 3-methyl-2-butanol, ethyl-pentanoate are molecules comprising respectively 4, 4, 5 and 7 carbon atoms.

The term "essentially all", as present in this document, means more than 80% of the identified subject matter to which it refers, preferably more that 90%, more preferably more than 95%, and even more preferably more than 98% of the subject matter to which it refers. When the term "essentially all" directly refers to a product or a composition, percentage is weight percent (wt %).

Above-mentioned $C_{4+}$ cut can be obtained by distillation of fusel oil until all or essentially all of $C_3$ containing products and lighter products are evaporated from the fusel oil.

The $C_5$ olefin mixture may optionally contain at least one $C_6$ olefin chosen among 1-hexene, 2-hexene, 3-hexene, 2-methyl-1-pentene, 3-methyl-1-pentene, 4-methyl-1-pentene, 2-ethyl-1-butene, 2,3-dimethyl-1butene, 2,3-dimethyl-2butene, cyclohexene, 2-methyl-2-pentene, 3-methyl-2-pentene, 3,3-dimethyl-1-butene, 1-methyl-cyclopentene, 3-methyl-cyclopentene, 4-methyl-cyclopentene, methylene-cyclopentane.

The $C_5$ olefin mixture may optionally contain at least one $C_4$ olefin chosen among 1-butene, 2-butene, 2-methyl-1-propene.

The optionally substituted vinyl aromatic is chosen among styrene, alpha-methyl-styrene, a vinyl toluene, a vinyl xylene, a vinyl ethyl benzene, a vinyl ethyl toluene, a vinyl ethyl xylene, a vinyl isopropyl toluene, a vinyl isopropyl xylene, and their mixtures, and wherein the C4-C6 conjugated diene is selected from 1,3-butadiene, isoprene, piperylene, 1-methyl-cyclopentadiene, 2-methyl-cyclopentadiene, 5-methyl-cyclopentadiene, α-farnesene, β-farnesene, and their mixtures and their cis and/or trans isomers. Piperylene and β-farnesene are preferred.

More preferably, the optionally substituted vinyl aromatic is alpha-methyl-styrene, styrene, or their combination.

The catalyst or initiating system is preferably a Lewis acid, more preferably a Friedel-Crafts catalyst, advantageously chosen among metal halides, the metal being preferably chosen among B, Al, Ti and Sn, the halide being preferably chosen among fluoride, chloride and bromide, the metal halide being preferably selected among $BF_3$, $AlCl_3$, $SnCl_4$, $TiCl_3$ and $TiCl_4$.

The $C_5$ olefin mixture according to the first aspect of the invention is preferably obtained from dehydration of a $C_5$ alcohol or a $C_5$ alcohol mixture.

When the $C_5$ olefin is obtained from dehydration of a $C_5$ alcohol or $C_5$ alcohol mixture, the said $C_5$ alcohol or alcohol mixture preferably comes from fermentation, preferably from fusel oil.

The initial $C_5$ alcohol or $C_5$ alcohol mixture is preferably obtained by fermentation of a biomass feedstock, wherein the biomass feedstock is preferably raw or refined fusel oil, more preferably a C4+ or C4-C6 cut, even more preferably a C5 cut isolated from fusel oil.

The dehydration step of the $C_5$ alcohol or $C_5$ alcohol mixture to obtain the $C_5$ olefin mixture is carried out in the presence of a dehydration catalyst, containing at least one of (a) zeolites having preferably the MFI, MTT, FER, MEL, TON, MWW, EUO, MFS structure, (b) alumina, (c) silica-alumina, and (d) alumino silicate. Preferably, the dehydration catalyst is chosen from gamma-alumina, H-ZSM-S, H-FER, ZSM-5 containing phosphorous or any mixture thereof.

According to another advantageous embodiment, the catalyst is a ferrierite catalyst, preferably a zeolite ammonium ferrierite powder or in the form of extrudates (Zeolyst, CP914 CYL-1.6).

The $C_5$ olefin mixture is separated by distillation.

The compositions according to the first aspect of the invention are suitable for the preparation of tackifying resins.

Adhesive composition obtained by combining tackifying resin and elastomer according to the first aspect of the invention are accessible. In this case, the elastomer is selected from the group consisting of styrene-isoprene block copolymers, polyacrylate resins, poly ethylene vinyl acetate (EVA) resins, poly styrene butadiene resins, random styrene butadiene (SBR) copolymers, styrene butadiene block copolymers, styrene butadiene styrene (SBS) block copolymers, styrene isoprene butadiene styrene (SIBS) copolymers, styrene ethylene propylene styrene (SEPS) copolymers, styrene ethylene butylene styrene (SEBS) block copolymers, amorphous polyolefin (APO) resins, and mixtures thereof.

According to a second aspect, the invention is about an article comprising a substrate and an adhesive composition according to the first aspect, applied to at least one part of at least one surface of the substrate, wherein the substrate is selected from the group consisting of a tape, a label, wood, wood composite, woven or non-woven fabric, paper, cardboard, carton, and a book-binding.

According to a third aspect, the invention discloses a case and carton assembly line comprising an adhesive station, wherein the adhesive station dispenses the adhesive composition according to the first aspect of the invention.

Unless otherwise specified in the present document, percentages are given in percentage by weight.

EXPERIMENTAL

Dehydration process conditions. General procedure:

In examples 1 and 2, $C_5$ alcohols were dehydrated over a $\gamma$-$Al_2O_3$ catalyst. $\gamma$-$Al_2O_3$ catalyst, as pellets of 35-45 mesh (0.500-0.354 μm) is obtained by crushing $\gamma$-$Al_2O_3$, as 1.2 mm extrudates, which exhibit the following textural properties: specific surface area of 200 $m^2$/g, porous distribution centered around 124 Å and porous volume of 0.588 ml/g.

A stainless-steel tubular reactor having an internal diameter of 10 mm is loaded with 20 ml of the $\gamma$-$Al_2O_3$ catalyst pellets. The void spaces before and after the catalyst are filled with granulated SiC of 0.5 mm.

The temperature profile is monitored with the aid of a thermocouple placed inside the reactor. Reactor temperature is increased at a rate of 60° C./h to 550° C. under 45 NL/h $N_2$ and 10 NL/h air. Once at 550° C., nitrogen flow is then reduced to 30 NL/h. After 30 minutes, nitrogen flow is further reduced to 10 NL/h. After a further 30 minutes, nitrogen flow is stopped and airflow increased to 20 NL/h. after 1 hour, reactor temperature is then decreased to the temperature of the test and then purged by nitrogen. The nitrogen is then replaced by the $C_5$ alcohols feed (either a pure 3-methylbutan-1-ol feed or crude fusel oil). The catalytic tests are then performed down-flow, at near atmospheric pressure (pressure of 2 barg (bar gauge)), in a temperature range of 300-450° C. and with a weight hour space velocity (WHSV) varying from 2 to 7 $h^{-1}$. Analysis of the products is performed by using an on-line gas chromatograph.

Example 1: 3-methylbutan-1-ol Dehydration 3-methylbutan-1-ol was fed through a pre-heater and onto the catalyst bed, with an initial internal reactor temperature of 250° C. and an LHSV of 4 $hr^{-1}$. The temperature was then increased by 25° C. at 12 h intervals until 450° C.

Complete alcohol conversion is observed from 325° C. with about 86% of 3-methylbut-1-ene (kinetic isomer) 10% 2-methylbut-2-ene and 3% of 2-methylbut-1-ene. From 375° C., the proportion of 2-methylbut-2-ene (thermodynamic isomer) and/or 2-methylbut-1-ene is observed to be superior to that of 3-methylbut-1-ene. From 400° C., the proportion of 2-methylbut-2-ene is observed to be superior to that of 2-methylbut-1-ene and/or 3-methylbut-1-ene. See, table 1, below for detailed results.

TABLE 1

| LHSV ($h^{-1}$) | 4 | 4 | 4 | 4 | 4 | 4 | 4 | 4 | 4 |
|---|---|---|---|---|---|---|---|---|---|
| T (° C.) | 250 | 275 | 300 | 325 | 350 | 375 | 400 | 425 | 450 |
| 3MB1 | 2.5 | 5.1 | 56.6 | 86.2 | 63.3 | 38.5 | 9.3 | 4.8 | 4.9 |
| 2MB1 | 0.0 | 0.0 | 0.5 | 3.0 | 9.7 | 17.4 | 27.1 | 29.3 | 28.7 |
| 2MB2 | 0.0 | 0.1 | 2.3 | 10.0 | 26.3 | 43.1 | 62.3 | 63.8 | 60.1 |
| Diisoamyl ether | 76.9 | 35.8 | 13.2 | 0.1 | 0.0 | 0.0 | 0.0 | 0.0 | 0.0 |
| 3MB1-OH | 20.2 | 58.6 | 26.5 | 0.0 | 0.0 | 0.0 | 0.0 | 0.0 | 0.0 |
| other | 0.4 | 0.3 | 0.9 | 0.6 | 0.7 | 1.0 | 1.3 | 2.2 | 6.4 |

3MB1: 3-methylbut-1-ene;
2MB1: 2-methylbut-1-ene;
2MB2: 2-methylbut-2-ene;
3MB1OH: 3-methylbutan-1-ol Example 2: Fusel Oil Dehydration A biosourced crude fusel oil feed containing approximately 20.9 wt % ethanol, 1.5 wt % 1-propanol, 0.3 wt 1-butanol, 14.0 wt % isobutanol, 45.6 wt % 3-methylbutan-1-ol, 16.7 wt % 2-methylbutan-1-ol, 0.1 wt % ethyl pentanoate, 0.3 wt % ethyl hexanoate, and higher ethyl esters and pyrazine derivatives, is subjected to dehydration to produce $C_5$ olefins as main constituents.

Following filtration to remove fine particles, fusel oil was fed through a pre-heater and onto the catalyst bed, with an initial internal reactor temperature of 400° C., and an overall feed LHSV of 4 $hr^{-1}$. The temperature was then increased to 425° C. The results are displayed in table 2, below.

TABLE 2

| LHSV (h⁻¹) | 4 | 4 |
|---|---|---|
| T (° C.) | 400 | 425 |
| $C_2$ (ethylene) | 16.0 | 10.4 |
| $C_3$ (propylene) | 1.3 | 0.9 |
| $C_4$ (butenes) | 12.2 | 7.3 |
| 3-methylbut-1-ene | 33.2 | 11.9 |
| 2-methylbut-1-ene | 8.9 | 7.9 |
| 2-methylbut-2-ene | 21.0 | 17.9 |
| Higher olefin and others | 7.5 | 43.7 |

Complete alcohol conversion is observed at both temperatures. At 400° C., 3-methylbut-1-ene makes up around 53 wt % of isoamylenes. Increasing the temperature to 425° C. resulted in an increased proportion of $C_5$ olefin 2-methylbut-2-ene and to a decreased total isoamylenes yield due to the formation of heavier compounds.

Example 3: Polymers Made with $C_5$ Olefins

Seven polymerizations of an aromatic modified aliphatic resin were completed using the various isomers of methyl butene; 2-methylbut-2-ene (2MB2), 2-methylbut-1-ene (2MB1), and 3-methylbut-1-ene (3MB1) along with their mixtures. The resulting resins were characterized by their glass transition temperatures (Tg), color, and molecular weights.

2MB2 was distilled before use. 2MB1 and 3MB1 are essentially pure and were used as purchased. In case $C_5$ olefins originate from fusel oil, appropriate distillation may yield desired $C_5$ olefins or a $C_5$ olefin cut. In this respect, it may be desirable for economical and/or product properties reasons to use a $C_5$ olefin cut comprising $C_4$ olefins and/or $C_6$ olefins.

The polymerization feed comprised piperylene concentrate which was distilled before use, alpha methylstyrene, and branched olefin. The 2MB2 in the base case blend was replaced in kind by the other branched olefins and the branched olefin blends.

The described resins were obtained by the cationic polymerization of feed blends comprising cis- and trans-piperylene, a branched olefin or branched olefin blend, and alpha-methylstyrene. They were conducted by a semi-batch mode in a round-bottom flask equipped with a stirrer and a cold water condenser. The flask was purged with nitrogen for 20 minutes before a heel of 10 g of toluene was added and the reactor temperature was raised to 35° C. using an external jacket. To the well-stirred toluene heel, 0.3 g of anhydrous aluminum chloride powder was added. When the powder was well dispersed, the feed blend was added at a rate of 1.5 mL/min resulting in an exothermic reaction. Subsequent 0.3 g aliquots of aluminum chloride powder were added after 10, 60, 110, and 160 mL of feed had been added over a total period of 110 minutes. When the entire feed blend (approximately 100 g) had been added, the mixture was stirred for an additional 30 minutes at which point the reaction was no longer exothermic. At this time, the catalyst was quenched with the addition of approximately 10 g of anhydrous isopropanol. The clear, yellow solution was then added to approximately 30 g of water in a 250-mL separatory funnel, shaken, and then allowed to separate into organic and aqueous phases. The lower aqueous phase was removed and the organic phase washed twice more with 25% aqueous isopropanol.

The organic phase was then transferred to a 250-mL, 3-neck flask equipped with a thermocouple, a nitrogen purge, and a Dean-Stark trap fitted with a cold water condenser, along with an antioxidant (0.2 wt % on expected resin yield). The flask was heated by means of a heating mantel to a temperature of 230° C. during which time non- and un-reacted components were collected. When the pot temperature reached 230° C., the nitrogen purge was replaced with a steam purge. While maintaining a 230° C. pot temperature, steam condensate was collected along with low molecular oligomeric material. When a quantity of steam condensate equal to that of resin yield (approximately 60 g), a nitrogen purge was restored in order to remove the last traces of water. The product resin was obtained as a light yellow molten liquid that solidified upon cooling to afford a clear, friable solid.

Without willing to be bound by a theory, it seems branched olefins, i.e. tri-substituted olefins, are effective chain transfer agents due to the formation of a tertiary cation when incorporated into a growing polymer chain during cationic polymerization. This tertiary cation may add another monomer or, more likely, lose a proton to a monomer thus forming an unsaturated chain end and transferring the polymerization process to a new polymer chain. Both 2MB1 and 2MB2 form more stable tertiary cations than 3MB1. One might assume that 3MB1 under the acidic conditions of Friedel Crafts polymerization, rearrange by proton migration to form 2MB2.

Results of the seven polymerizations carried out that tested the ability of the three branched olefins individually and in combination to control Tg/molecular weight in a typical Wing tack formulation, are shown in Table 3, below.

Run 1 represents the base case where the only added branched olefin is 2MB2. In runs 2 and 3, 2MB1 and 3MB1 were used in place of 2MB2. Runs 4 through 7 used blends combining 2MB1, 2MB2 and 3MB1. Tg and molecular weight are generally understood to be directly related given a constant resin composition. So while 2MB1 and 2MB2 give similar tertiary cationic intermediates, they give slightly different structures upon adding another monomer (propagation) or proton loss. Polymerization of 2MB1 results in highly substituted carbons adjacent to a methylene carbon whereas polymerization product from 2MB2 contains adjacent methyl groups that hinder rotation about the common bond. Such steric hindrance is believed to increase the energy needed to achieve molecular mobility and results in a slightly higher Tg. This effect is seen in Table 3 where despite the identical molecular weights obtained in Runs 1 and 2, 2MB2 gives a resin with a higher Tg. 3MB1 is likely not as effective in chain transfer as this branched olefin produces a resin having a higher Tg and molecular weight.

Runs 4 through 7 give results that are weighted averages of the effects from the three branched olefins. For each of runs #1 to #7, piperylene, as mixture of cis+trans isomers stands for 30-35 wt % of the total feed blend, and alpha-methyl-styrene stands for 2-6 wt % of the total feed blend. The remaining is the branched olefin composition as specified in table 3, and a solvent, preferably a stream of olefins and aliphatics that is recovered by distillation from the product resin solution during finishing process.

There was no significant effect of the nature of branched olefin on resin color.

TABLE 3

| | Physical properties | | | | | | | |
|---|---|---|---|---|---|---|---|---|
| Run# | | 1 | 2 | 3 | 4 | 5 | 6 | 7 |
| Branched olefin | 2MB2 | 8.5 | 0.0 | 0.0 | 2.7 | 4.7 | 5.4 | 6.0 |
| composition (g) | 2MB1 | 0.0 | 8.5 | 0.0 | 1.0 | 1.2 | 2.0 | 2.0 |
| | 3MB1 | 0.0 | 0.0 | 9.9 | 4.8 | 2.6 | 1.1 | 0.6 |
| Glass transition temperature (Tg, ° C.) | | 45.5 | 38.2 | 50.8 | 48.0 | 47.5 | 45.1 | 39.8 |
| Color, G | | 2.4 | 2.3 | 2.4 | 2.2 | 2.3 | 2.2 | 2.3 |
| Molecular weight | Mn | 830 | 792 | 589 | 829 | 824 | 817 | 811 |
| | Mw | 1364 | 1312 | 1618 | 1436 | 1400 | 1361 | 1347 |
| | Mz | 2168 | 2145 | 2961 | 2403 | 2322 | 2210 | 2168 |
| Molecular weight distribution (MWD) | | 1.64 | 1.66 | 1.88 | 1.73 | 1.70 | 1.67 | 1.66 |
| Conversion, % | 2MB2 | 86.0 | 86.8 | 91.7 | 89.2 | 87.7 | 88.3 | 99.4 |
| | 2MB1 | 87.6 | 96.4 | 100.0 | 93.6 | 92.8 | 95.1 | 100.0 |
| | 3MB1 | — | — | 69.9 | 78.8 | 75.9 | 82.3 | 72.8 |

Conversion rates of 2MB1 and 2MB2 are high, generally above 85% whereas the conversion of 3MB1 is somewhat lower. This is likely due to the relatively more stable tertiary cation intermediates that are formed with 2MB1 and 2MB2 versus the less stable secondary cation formed when 3MB1 is incorporated. This is in agreement with the relatively low conversions of 2-pentenes that are generally found as a component of piperylene concentrate.

2MB1, 2MB2, and 3MB1 are each individually and in combination apt to control Tg and molecular weight in the synthesis of a typical aromatic modified resin comprised of piperylene, alpha methylstyrene, and branched olefin.

Unexpectedly, mixtures of 2MB1 and/or 2MB2 comprising significant amounts of 3MB1 were polymerized with high conversion rates, while reaching acceptable molecular weight and MWD, and achieving satisfying Tg.

First alternative dehydration process. General procedure:

In Examples 4 to 6, $C_5$ alcohols were dehydrated over a ferrierite catalyst. A ferrierite catalyst (Zeolyst CP914, powder) was calcined under 50 NL/h $N_2$ at 550° C. for 6 h (1° C./min). The catalyst was then crushed and sieved to 35-45 mesh. 10 mL of catalyst (5.53 g) was loaded, diluted with 10 mL of carborandum (SiC 0.5 mm).

A stainless-steel tubular reactor having an internal diameter of 10 mm is loaded with 10 mL of ferrierite catalyst. The void spaces before and after the catalyst are filled with an equivalent volume of SiC granulated at 0.5 mm. The temperature profile is monitored with the aid of a thermocouple placed inside the reactor. Analysis of the products is performed by using an on-line gas chromatograph.

Reactor temperature was increased at a rate of 60° C./h to 550° C. under 10 NL/h $N_2$. After 1 hour, reactor temperature was then decreased to the temperature of the test and then purged by nitrogen.

Example 4: 3-methylbutan-1-ol Dehydration 3-methylbutan-1-ol was fed through a pre-heater and onto the catalyst bed, with an initial internal reactor temperature of 220° C., an LHSV of 8 $hr^{-1}$ and a pressure of 2 barg.

At 220° C. a 3-5% alcohol conversion was observed. Increasing the temperature to 240° C. resulted in only a marginal higher conversion of 4-5%. At 260° C., a 98% conversion was observed with selectivity of 59% towards 2-methylbut-2-ene. At 270° C., conversion increased to >99% and 60% 2-methylbut-2-ene. Selectivity and conversion remained constant for 60 h at 270° C. with no signs of catalyst deactivation.

Example 5: 2-methylbutan-1-ol Dehydration 2-methylbutan-1-ol was fed through a pre-heater and onto the catalyst bed with an initial internal reactor temperature of 240° C., an LHSV of 8 $hr^{-1}$ and a pressure of 2 barg. At 240° C., a 5-6% alcohol conversion was observed. At 260° C., alcohol conversion increased to 80-85% with selectivity of 59% towards 2-methylbut-2-ene.

Example 6: Distilled Fusel Oil Dehydration

A biosourced distilled fusel oil feed (125-135° C. cut) containing less than 0.1 wt % ethanol, less than 0.1 wt % 1-propanol, less than 0.1 wt % 1-butanol, approximately 1.0 wt % isobutanol, 83.5 wt % 3-methylbutan-1-ol, 13.8 wt % 2-methylbutan-1-ol, less than 0.1 wt % ethyl pentanoate, and higher ethyl esters and pyrazine derivatives, was subjected to dehydration to produce C5 olefins as main constituents, i.e. a C5 olefin mixture according to the invention.

Distilled fusel oil was fed through a pre-heater and onto the catalyst bed with an initial internal reactor temperature of 260° C., an overall feed LHSV of 8 $hr^{-1}$ and a pressure of 2 barg.

The temperature was then increased gradually to 375° C. where a 78% isoamyl alcohol conversion was observed. At 400° C., this conversion increased to >99%, with selectivity of 55% towards 2-methylbut-2-ene. These operating conditions were maintained for 100 h with no perceived loss in selectivity.

Second alternative dehydration process. General procedure:

In Examples 7 to 9, $C_5$ alcohols were dehydrated over a ferrierite catalyst. A ferrierite catalyst (Zeolyst, CP914 CYL-1.6) as extrudates was crushed and sieved to 35-45 mesh. 10 mL of catalyst (6.26 g) were loaded and diluted with 10 mL of carborandum (SiC 0.5 mm).

A stainless-steel tubular reactor having an internal diameter of 10 mm is loaded with 10 mL of ferrierite catalyst. The void spaces before and after the catalyst are filled with an equivalent volume of SiC granulated at 0.5 mm. The temperature profile is monitored with the aid of a thermocouple placed inside the reactor. Analysis of the products is performed by using an on-line gas chromatograph.

Reactor temperature was increased at a rate of 60° C./h to 550° C. under 10 NL/h $N_2$. After 1 hour, reactor temperature was then decreased to the temperature of the test and then purged by nitrogen.

Example 7: 3-methylbutan-1-ol Dehydration 3-methylbutan-1-ol was fed through a pre-heater and onto the catalyst bed with an initial internal reactor temperature of 240° C., an LHSV of 8 hr$^{-1}$ and a pressure of 2 barg.

At 240° C., a 2-3% alcohol conversion was observed. Increasing the temperature to 250° C. resulted in a higher conversion of approximately 20%. At 260° C., a >99% conversion was observed with selectivity of 60-61% towards 2-methylbut-2-ene. Selectivity remained stable for 22 h at 260° C. A 3-methylbutan-1-ol feed with 8% water was then injected and the temperature maintained at 260° C. for 90 h during which selectivity towards 2-methylbut-2-ene remained stable at 60-61% despite formation of 1-2% heavier compounds.

Example 8: 2-Methylbutan-1-ol Dehydration 2-methylbutan-1-ol was fed through a pre-heater and onto the catalyst bed with an initial internal reactor temperature of 240° C., an LHSV of 8 hr$^{-1}$ and a pressure of 2 barg.

At 240° C., a 96-98% isoamyl alcohol conversion was observed towards 23-24% 2-methylbut-2-ene and 41-42% trans-2-pentene. At 250° C., the alcohol conversion increased to >99% towards approximately 50% 2-methylbut-2-ene and 24% trans-2-pentene. Increasing the reactor temperature to 260° C. resulted in an increased 2MB2 selectivity around 59%. At 270° C., stable selectivity towards 60% 2MB2 was observed over 10 h.

Example 9: Distilled Fusel Oil Dehydration

A biosourced distilled fusel oil feed (125-135° C. cut) containing less than 0.1 wt % ethanol, less than 0.1 wt % 1-propanol, less than 0.1 wt % 1-butanol, approximately 1.0 wt % isobutanol, 83.5 wt % 3-methylbutan-1-ol, 13.8 wt % 2-methylbutan-1-ol, less than 0.1 wt % ethyl pentanoate, and higher ethyl esters and pyrazine derivatives, was subjected to dehydration to produce C5 olefins as main constituents, i.e. a C5 olefin mixture according to the invention.

Distilled fusel oil was fed through a pre-heater and onto the catalyst bed with an initial internal reactor temperature of 270° C., and an overall feed LHSV of 8 hr$^{-1}$ and a pressure of 2 barg.

The temperature was then increased gradually until desired results were obtained. Initial results at 350° C. showed near complete conversion (<1% alcohol) with 60% selectivity for 2MB2. Temperature increase to 360° C. resulted in 62-63% selectivity, stable for 50 h at 360° C. (to 195 h on stream). Increased temperature to 380° C. appeared to marginally decrease 2MB2 selectivity in favor of trans-2-pentene and cis-2-pentene.

The invention claimed is:

1. A composition resulting from polymerization, in the presence of a catalyst or initiating system, of at least
   (i) a $C_4$-$C_6$ conjugated diene or a $C_{15}$ hydrocarbon having at least one olefinic functional group,
   (ii) a $C_5$ olefin mixture,
   and optionally
   (iii) an optionally substituted vinyl aromatic,
   the composition having a glass transition temperature Tg above 35° C., wherein the $C_5$ olefin mixture contains at least 5 wt % of an olefin mixture comprising (a) 2-methyl-2-ene, (b) 2-methyl-but-1-ene and (c) 3-methyl-but-1-ene.

2. The composition according to claim 1, wherein the $C_5$ olefin mixture contains at least 5 wt % of an olefin mixture comprising (a) 2-methyl-but-2-ene, (b) 2-methyl-but-1-ene, (c) 3-methyl-but-1-ene and (d) cis-2-pentene and/or trans-2-pentene.

3. The composition according to claim 1, having a number average molecular mass Mn from 400 to 2400 g/mol, a mass average molecular mass Mw from 900 to 4000 g/mol, a Z-average molecular mass Mz from 1500 to 6000 g/mol, a molecular weight distribution Mw/Mn from 1.50 to 1.90.

4. The composition according to claim 3, having a number average molecular mass Mn from 600 to 1400 g/mol, a mass average molecular mass Mw from 1000 to 2400 g/mol, and a Z-average molecular mass Mz from 2000 to 4000 g/mol.

5. The composition according to claim 1, wherein the $C_5$ olefin mixture contains at least one $C_6$ olefin chosen among 1-hexene, 2-hexene, 3-hexene, 2-methyl-1-pentene, 3-methyl-1-pentene, 4-methyl-1-pentene, 2-ethyl-1-butene, 2,3-dimethyl-1butene, 2,3 dimethyl-2butene, cyclohexene, 2-methyl-2-pentene, 3-methyl-2-pentene, 3,3-dimethyl-1-butene, 1-methyl-cyclopentene, 3-methyl-cyclopentene, 4-methyl-cyclopentene, methylene-cyclopentane.

6. The composition according to claim 1, wherein the $C_5$ olefin mixture contains at least one $C_4$ olefin chosen among 1-butene, 2-butene, 2-methyl-1-propene.

7. The composition according to claim 1, wherein the optionally substituted vinyl aromatic is chosen among styrene, alpha-methyl-styrene, a vinyl toluene, a vinyl xylene, a vinyl ethyl benzene, a vinyl ethyl toluene, a vinyl ethyl xylene, a vinyl isopropyl toluene, a vinyl isopropyl xylene, and their mixtures, and wherein the $C_4$-$C_6$ conjugated diene or $C_{15}$ hydrocarbon having at least one olefinic functional group is selected from 1,3-butadiene, isoprene, piperylene, 1-methyl-cyclopentadiene, 2-methyl-cyclopentadiene, 5-methyl-cyclopentadiene, α-farnesene, β-farnesene, and their mixtures and their cis and/or trans isomers.

8. The composition according to claim 1, wherein the catalyst or initiating system is a Lewis acid, or a Friedel-Crafts catalyst.

9. The composition according to claim 8, wherein the Friedel-Crafts catalyst comprises a metal halide, wherein the metal comprises B, Al, Ti or Sn, and the halide comprises fluoride, chloride or bromide.

10. The composition according to claim 1, wherein the $C_5$ olefin mixture is obtained from dehydration of a $C_5$ alcohol or a $C_5$ alcohol mixture.

11. The composition according to claim 10, wherein the $C_5$ alcohol or $C_5$ alcohol mixture comes from fermentation from a fusel oil.

12. A tackifying resin comprising a composition according to claim 1.

13. An adhesive composition comprising the tackifying resin according to claim 12, and an elastomer.

14. The adhesive composition according to claim 13, wherein the elastomer is selected from the group consisting of styrene-isoprene block copolymers, polyacrylate resins, poly ethylene vinyl acetate (EVA) resins, poly styrene butadiene resins, random styrene butadiene (SBR) copolymers, styrene butadiene block copolymers, styrene butadiene styrene (SBS) block copolymers, styrene isoprene butadiene styrene (SIBS) copolymers, styrene ethylene propylene styrene (SEPS) copolymers, styrene ethylene butylene styrene (SEBS) block copolymers, amorphous polyolefin (APO) resins, and mixtures thereof.

15. An article comprising a substrate and an adhesive composition according to claim 13 applied to at least one part of at least one surface of the substrate, wherein the substrate is selected from the group consisting of a tape, a label, wood, wood composite, woven or non-woven fabric, paper, cardboard, carton, and a book-binding.

16. A case and carton assembly line comprising an adhesive station, wherein the adhesive station dispenses an adhesive composition according to claim 14.

* * * * *